(12) United States Patent
Monat et al.

(10) Patent No.: US 9,613,747 B2
(45) Date of Patent: Apr. 4, 2017

(54) SYSTEM AND METHOD FOR EFFICIENT DATA COMMUNICATION AND WIRELESS POWER TRANSFER COEXISTENCE

(71) Applicant: QUALCOMM Incorporated, San Diego, CA (US)

(72) Inventors: Pavel Monat, San Diego, CA (US); Weston D. Braun, Encinitas (CA)

(73) Assignee: QUALCOMM Incorporated, San Diego, CA (US)

( * ) Notice: Subject to any disclaimer, the term of this patent is extended or adjusted under 35 U.S.C. 154(b) by 892 days.

(21) Appl. No.: 14/010,271

(22) Filed: Aug. 26, 2013

(65) Prior Publication Data

US 2015/0054345 A1    Feb. 26, 2015

(51) Int. Cl.
| | |
|---|---|
| H01F 27/42 | (2006.01) |
| H01F 37/00 | (2006.01) |
| H01F 38/00 | (2006.01) |
| H01F 38/14 | (2006.01) |
| H04B 5/00 | (2006.01) |
| H02J 50/10 | (2016.01) |
| H02J 50/80 | (2016.01) |

(52) U.S. Cl.
CPC .............. *H01F 38/14* (2013.01); *H02J 50/10* (2016.02); *H02J 50/80* (2016.02); *H04B 5/0031* (2013.01); *H04B 5/0037* (2013.01)

(58) Field of Classification Search
CPC . H01F 38/14; H02J 5/005; H02J 17/00; H02J 7/025; H02J 50/80; H04B 5/0037
See application file for complete search history.

(56) References Cited

U.S. PATENT DOCUMENTS 4,055,807 A * 10/1977 Priniski .................... H04B 1/48
                                                              455/78
8,212,735 B2    7/2012 Hyvonen et al.
(Continued)

FOREIGN PATENT DOCUMENTS

WO    WO-2010035256 A2    4/2010

OTHER PUBLICATIONS

International Search Report and Written Opinion—PCT/US2014/050079—ISA/EPO—Jan. 12, 2015.

*Primary Examiner* — Rexford Barnie
*Assistant Examiner* — Rasem Mourad
(74) *Attorney, Agent, or Firm* — Knobbe, Martens, Olson & Bear, LLP

(57) ABSTRACT

This disclosure provides systems, methods and apparatus for receiving power wirelessly. In one aspect, a receiver comprises an antenna that receives power wirelessly. The receiver further comprises a power circuit that operates according to a first frequency. The receiver further comprises a communication circuit that operates according to a second frequency. The receiver further comprises a circuit coupled between the antenna and the power circuit and the antenna and the communication circuit. The circuit comprises a first resonant network and a second resonant network. The circuit comprises a first path between the antenna and the power circuit via the first resonant network and a second path between the antenna and the communication circuit via the second resonant network. The first path has a higher impedance than the second path at the second frequency and has a lower impedance than the second path at the first frequency.

28 Claims, 8 Drawing Sheets

(56) References Cited

U.S. PATENT DOCUMENTS

| | | | |
|---|---|---|---|
| 8,238,823 B2 | 8/2012 | Maugars et al. | |
| 2008/0039903 A1* | 2/2008 | Chadwick | A61N 1/37276 607/61 |
| 2009/0001930 A1* | 1/2009 | Pohjonen | H01Q 1/2225 320/108 |
| 2010/0222010 A1 | 9/2010 | Ozaki et al. | |
| 2011/0018358 A1* | 1/2011 | Kozakai | H02J 7/025 307/104 |
| 2011/0215756 A1 | 9/2011 | Shimizu | |
| 2011/0244917 A1* | 10/2011 | Chiou | H04B 1/406 455/550.1 |
| 2012/0149301 A1* | 6/2012 | Wiley | H04B 5/0031 455/41.1 |
| 2013/0099584 A1* | 4/2013 | Von Novak, III | H04B 5/0037 307/104 |
| 2014/0203772 A1* | 7/2014 | Yeo | H03F 3/2171 320/108 |

\* cited by examiner

SYSTEM AND METHOD FOR EFFICIENT DATA COMMUNICATION AND WIRELESS POWER TRANSFER COEXISTENCE

FIELD

The present invention relates generally to wireless power. More specifically, the disclosure is directed to a device that includes a near field communication (NFC) system and a wireless power system.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

An increasing number and variety of electronic devices also engage in communications while in close proximity to other devices (e.g., near-field communications). For example, devices like mobile phones, portable music players, laptop computers, tablet computers, computer peripheral devices, communication devices (e.g., Bluetooth devices), digital cameras, hearing aids, and the like can communicate with each other while in close proximity to engage in transactions, data exchange, or setup protocols. Thus, it may be desirable to combine wireless power transfer systems and near-field communication systems on a single device. However, wireless power transfer systems and near-field communication systems can cause interference with and/or damage to the other system when both systems are present on a single device. As such, systems and methods that efficiently and safely allow for the coexistence of wireless power transfer systems and near-field communication systems are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a receiver for receiving power wirelessly. The receiver comprises an antenna configured to receive power wirelessly from a transmitter. The receiver further comprises a wireless power circuit configured to provide the power to a load and configured to operate according to a first frequency. The receiver further comprises a communication circuit configured to operate according to a second frequency. The receiver further comprises a circuit coupled between the antenna and the wireless power circuit and coupled between the antenna and the communication circuit. The circuit may comprise a first resonant network and a second resonant network. The circuit comprising a first path between the antenna and the wireless power circuit via the first resonant network and a second path between the antenna and the communication circuit via the second resonant network. The first path having a higher impedance than the second path at the second frequency and having a lower impedance than the second path at the first frequency.

Another aspect of the disclosure provides a method for receiving power wirelessly. The method comprises receiving power wirelessly from a transmitter via an antenna. The antenna may be coupled to a wireless power circuit via a first resonant network along a first path. The wireless power circuit may be configured to operate according to a first frequency. The antenna may be further coupled to a communication circuit via a second resonant network along a second path. The communication circuit may be configured to operate according to a second frequency. The first path may have a higher impedance than the second path at the second frequency and may have a lower impedance than the second path at the first frequency. The method further comprises transferring the power along the first path or the second path based on which path has a lower impedance.

Another aspect of the disclosure provides an apparatus for receiving power wirelessly. The apparatus comprises means for receiving power wirelessly from a transmitter. The means for receiving power wirelessly may be coupled to means for providing the power to a load via a first resonant network along a first path. The means for providing the power to a load may be configured to operate according to a first frequency. The means for receiving power wirelessly may be further coupled to means for providing the power to a communication chip via a second resonant network along a second path. The means for providing the power to a communication chip may be configured to operate according to a second frequency. The first path may have a higher impedance than the second path at the second frequency and may have a lower impedance than the second path at the first frequency. The apparatus further comprises means for transferring the power along the first path or the second path based on which path has a lower impedance.

Another aspect of the disclosure provides a non-transitory computer-readable medium comprising code that, when executed, causes an apparatus to receive power wirelessly from a transmitter via an antenna. The antenna may be coupled to a wireless power circuit via a first resonant network along a first path. The wireless power circuit may be configured to operate according to a first frequency. The antenna may be further coupled to a communication circuit via a second resonant network along a second path. The communication circuit may be configured to operate according to a second frequency. The first path may have a higher impedance than the second path at the second frequency and may have a lower impedance than the second path at the first frequency. The medium further comprises code that, when executed, causes an apparatus to transfer the power along the first path or the second path based on which path has a lower impedance.

Figure 1:
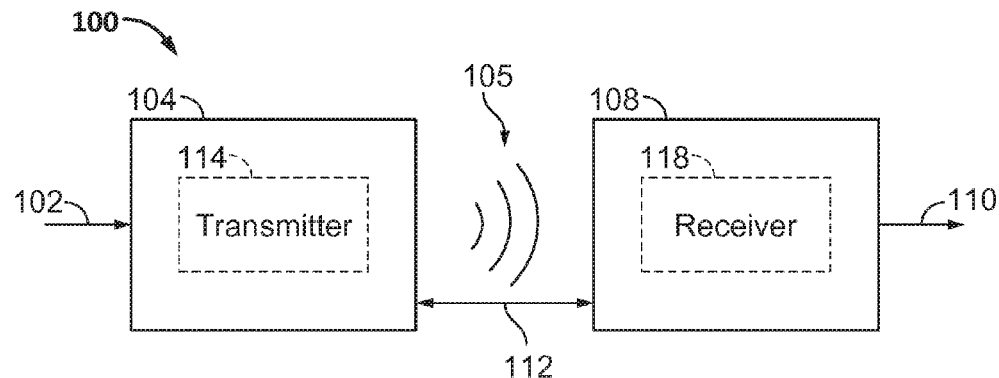
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
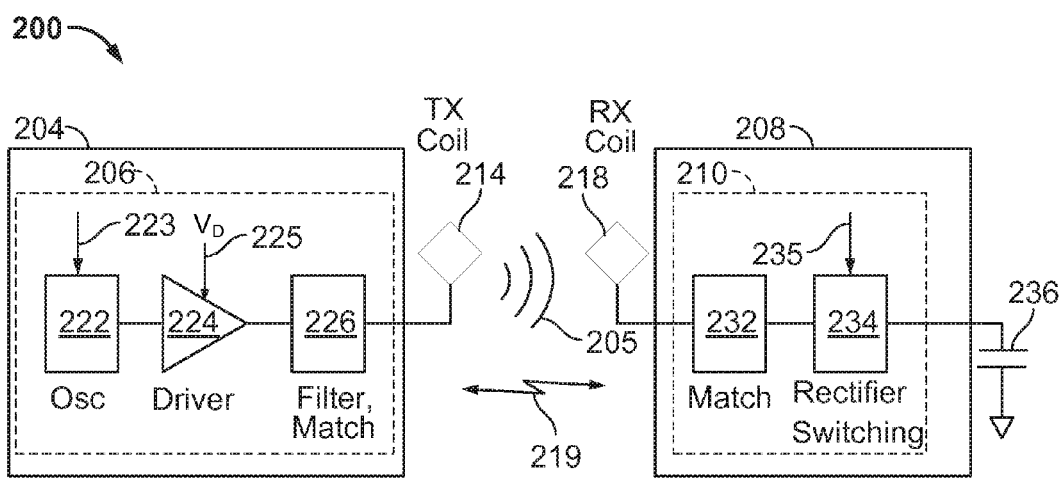
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
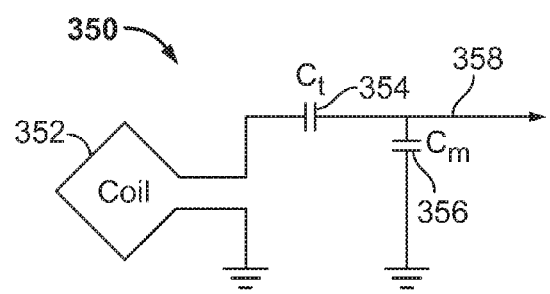
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
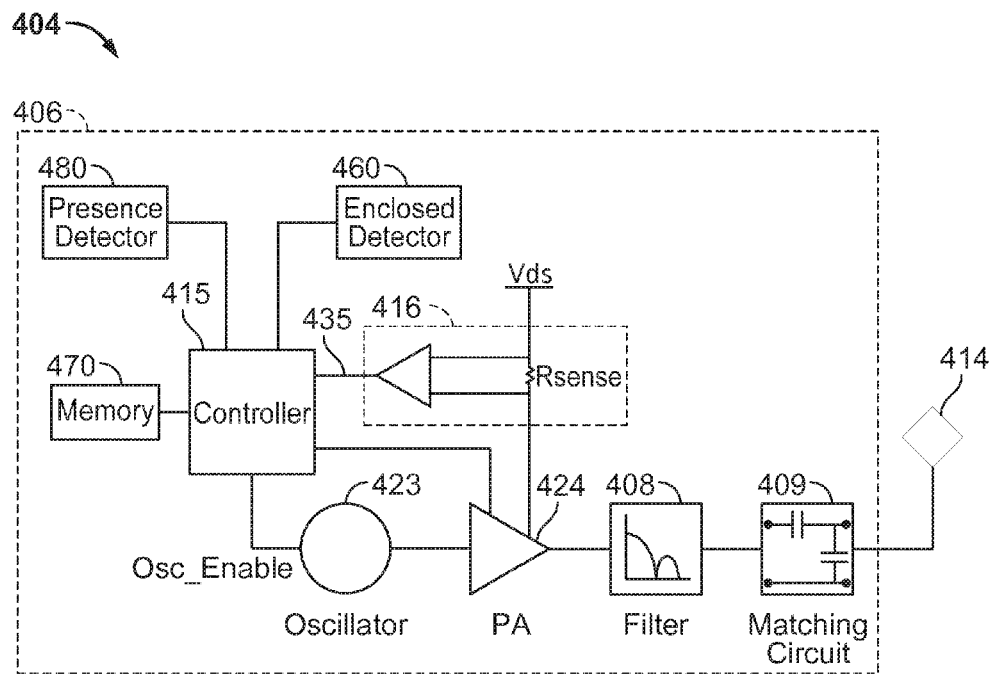
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
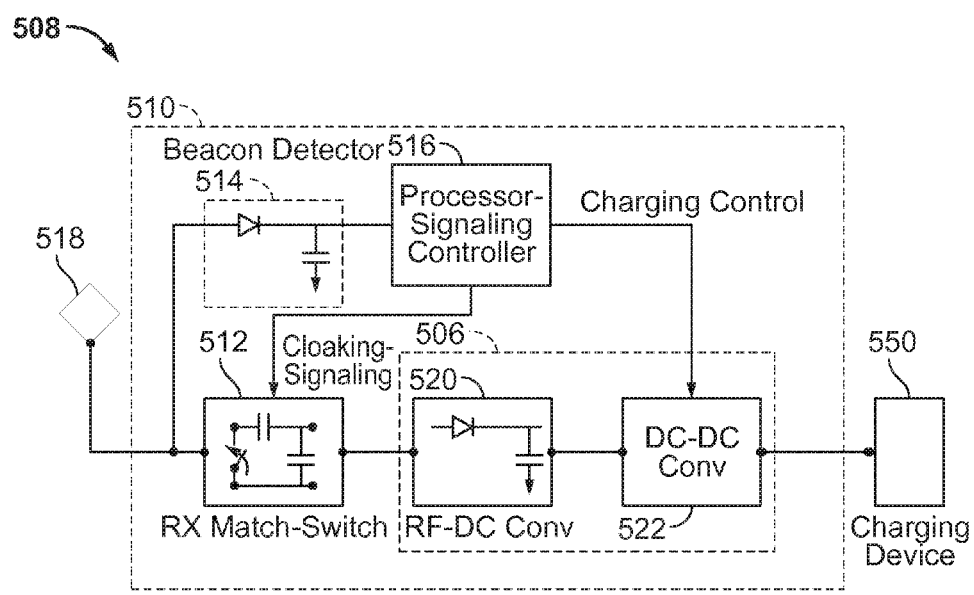
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
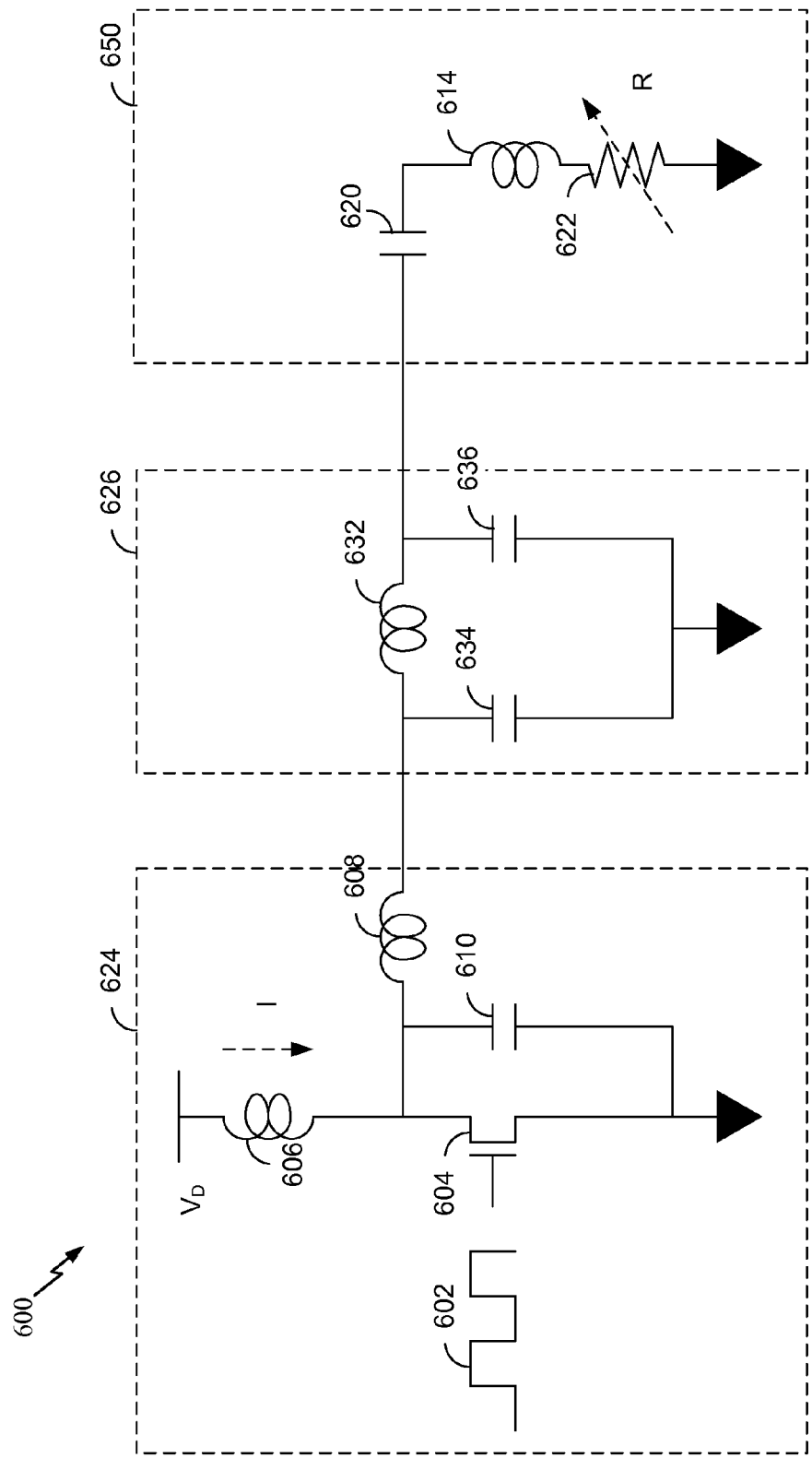
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In a wireless power transfer system, such as wireless power transfer system 100, a time-varying electromagnetic field is generated by a transmitter (e.g., transmitter 104) and a receiver (e.g., receiver 108) couples to the electromagnetic field for the purpose of power transfer. The receiver is usually found within a wireless device (e.g., a mobile handset, tablet, etc.) that may also utilize a communication transceiver (e.g., a near field communications (NFC) transceiver) for data communication. Since a wireless power transfer system and an NFC system work on a similar principle of inductive power transfer, it would be beneficial from a cost and area view point if the wireless power receiver and the NFC transceiver share the same antenna coil.

However, there may be several problems with the sharing of an antenna coil. For example, the power level of the power being wirelessly transferred could be high enough to damage and/or destroy the NFC circuitry. Switches could be introduced that block a signal from traveling to the NFC circuitry during certain periods (e.g., when the power level is too high), but the size of the switches would have to be large in order to handle high power levels. It would be desirable for the switches to be able to handle high power levels because, in conventional systems, the signal received by the receiver's antenna (e.g., the power transferred from the transmitter to the receiver) travels through the switches to either the wireless power transfer system or the NFC circuitry. Large low loss switches are generally expensive and do not fit well in consumer electronics (e.g., because they are too tall for electronics like handsets). Small switches have high loss and degrade system performance. In fact, adding any additional components to the wireless power transfer system and/or the NFC circuitry degrades system performance (e.g., due to the extra delay and loss associated with additional components present in the signal path). As another example, the NFC circuitry could degrade the efficiency of the wireless power transfer system. As another example, the wireless power transfer circuitry could degrade the performance and/or range of the NFC system.

To alleviate these concerns, a receiver is proposed that allows for the coexistence of a communication system (e.g., an NFC system) and a wireless power transfer system without the addition of any additional components in the signal path between the antenna and the communication system and the antenna and the wireless power transfer system.

Figure 7:
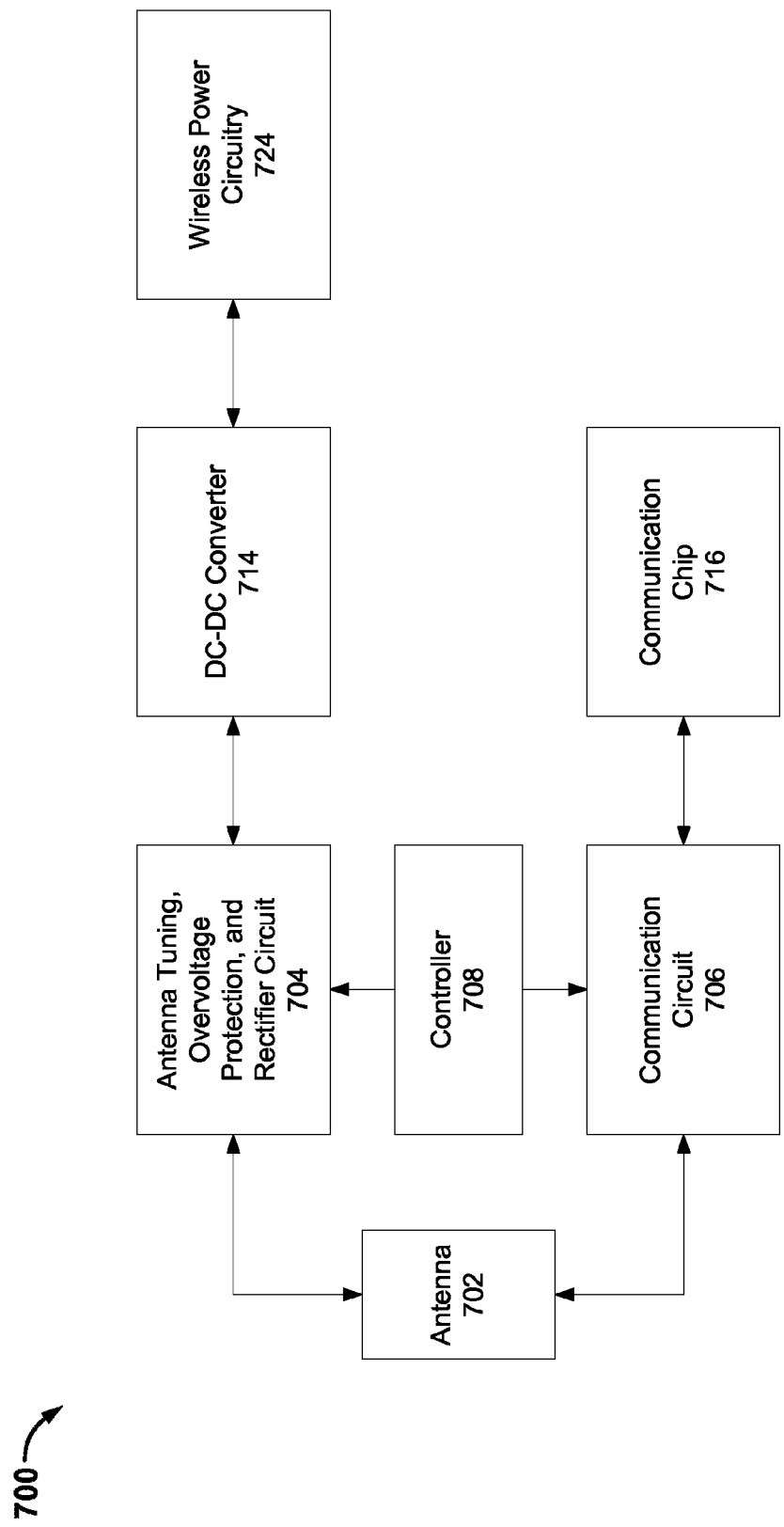
FIG. 7 is another functional block diagram of a receiver that may be used in the wireless power transfer system of FIG. 1.

FIG. 7 is another functional block diagram of a receiver 700 that may be used in the wireless power transfer system 100 of FIG. 1. As illustrated in FIG. 7, the receiver 700 includes an antenna 702, an antenna tuning, overvoltage protection, and rectifier circuit 704, a DC-DC converter 714, wireless power circuitry 724, a controller 708, a communication circuit 706, and/or a communication chip 716.

In an embodiment, the antenna tuning, overvoltage protection, and rectifier circuit 704 is configured to protect the DC-DC converter 714 and the wireless power circuitry 724 from high power levels that could damage components therein. The antenna tuning, overvoltage protection, and rectifier circuit 704 may include a rectifier that rectifies signals received from the antenna 702 and forwards the rectified signals to the DC-DC converter 714 and ultimately the wireless power circuitry 724 (e.g., so that the wireless power circuitry 724 can perform a charging operation). The antenna tuning, overvoltage protection, and rectifier circuit 704, the DC-DC converter 714, and the wireless power circuitry 724 may be used for receiving power wirelessly from a transmitter, such as the transmitter 104. The communication circuit 706 and the communication chip 716 may be used for NFC communication. The communication circuit 706 may forward signals received from the antenna 702 to the communication chip 716.

The antenna 702 is coupled to both the antenna tuning, overvoltage protection, and rectifier circuit 704 and the communication circuit 706. In an embodiment, the controller 708 is configured to enable a path between the antenna 702 and the DC-DC converter 714 via the antenna tuning, overvoltage protection, and rectifier circuit 704 or a path between the antenna 702 and the communication chip 716 via the communication circuit 706. The controller 708 may enable either path by controlling components in the antenna tuning, overvoltage protection, and rectifier circuit 704 and/or the communication circuit 706, which is described in greater detail below with respect to FIGS. 8A-B.

Figure 8A:
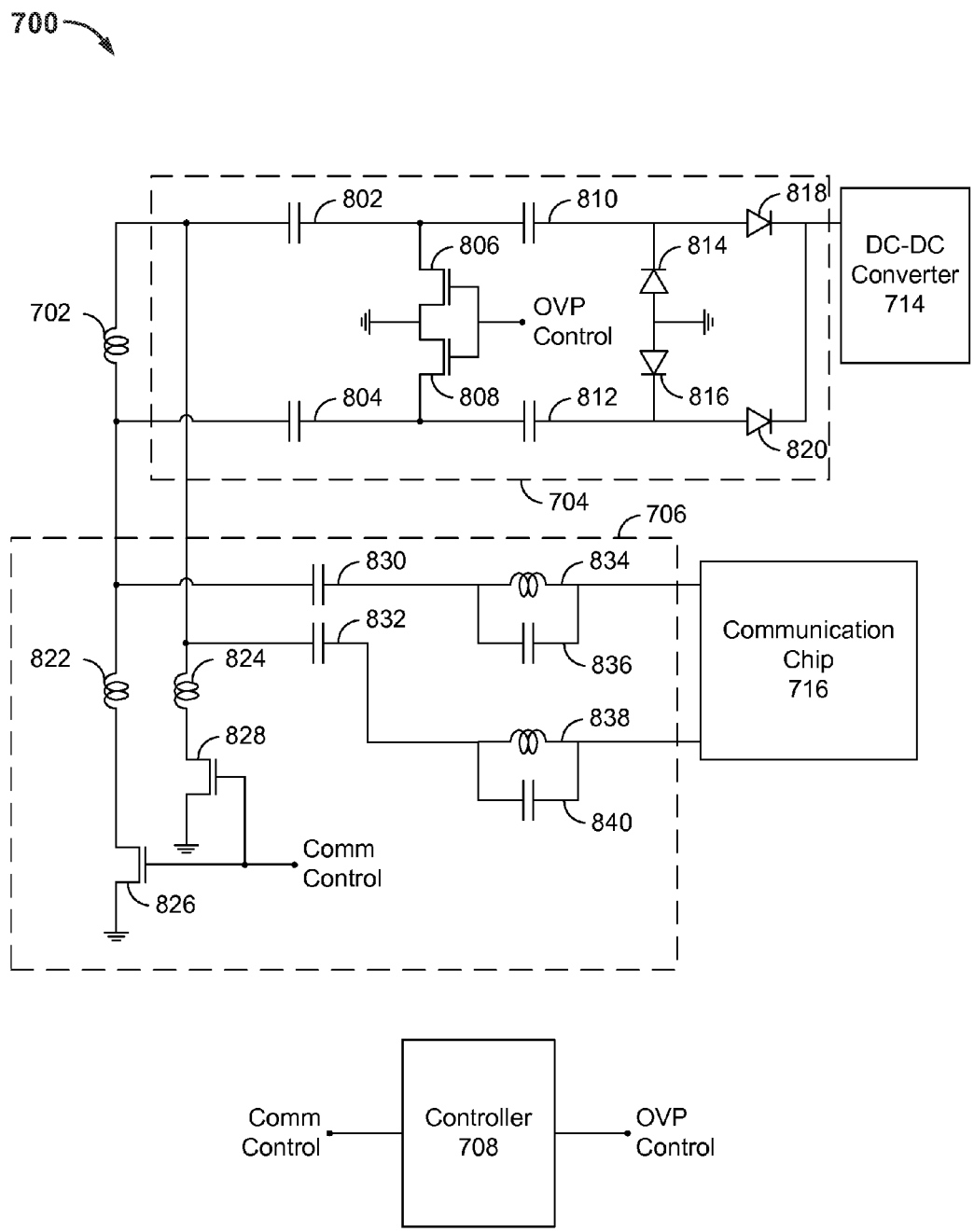
FIG. 8A is a more detailed functional block diagram of a receiver that may be used in the wireless power transfer system of FIG. 1.

FIG. 8A is a more detailed functional block diagram of the receiver 700 that may be used in the wireless power transfer system 100 of FIG. 1. As illustrated in FIG. 8A, the receiver 700 includes the antenna 702 (e.g., an inductor or coil), the antenna tuning, overvoltage protection, and rectifier circuit 704, the DC-DC converter 714, the communication circuit 706, the communication chip 716, and the controller 708. As described above, the antenna tuning, overvoltage protection, and rectifier circuit 704 and the communication circuit 706 share the antenna 702.

The antenna tuning, overvoltage protection, and rectifier circuit 704 may include four tuning capacitors 802, 804, 810, and 812, an overvoltage protection (OVP) circuit, and a rectifier circuit. The OVP circuit may include two switches 806 and 808 (e.g., transistors or any low loss switch, such as a relay, etc.). The rectifier circuit may include diodes 814, 816, 818, and 820.

The communication circuit 706 may include two tuning capacitors 830 and 832, two notch inductors 822 and 824, two notch filters (e.g., band-stop notch filters), and two switches 826 and 828 (e.g., transistors or any low loss switch, such as a relay, etc.). The first notch filter includes an inductor 834 coupled in parallel with a capacitor 836 (e.g., referred to herein as a resonant network). The second notch filter includes an inductor 838 coupled in parallel with a capacitor 840 (e.g., referred to herein as a resonant network). In an embodiment, the tuning capacitor 830 and the first notch filter are a part of a positive branch of the communication circuit 706 and the tuning capacitor 832 and the second notch filter are a part of a negative branch of the communication circuit 706.

In an embodiment, tuning capacitor 802 and notch inductor 822 are referred to herein as a resonant network. Likewise, tuning capacitor 804 and notch inductor 824 are referred to herein as a resonant network.

Switches 806, 808, 826, and 828 may be controlled by the controller 708. For example, the controller 708 outputs an OVP signal, which controls switches 806 and 808, and outputs a communication control signal, which controls switches 826 and 828. As illustrated in FIG. 8A, the switches 806 and 808 are not located within the signal path between the antenna 702 and the DC-DC converter 714. Likewise, the switches 826 and 828 are not located within the signal path between the antenna 702 and the communication chip 716. As described in greater detail below, the switches 806, 808, 826, and 828 instead are configured to tune in or tune out one or more resonant networks, and the one or more resonant networks are configured to determine the direction of a signal originating from the antenna 702.

In an embodiment, power received for wireless power operations may be received at a frequency of 6.78 MHz and power received for data communication (e.g., NFC) operations may be received at a frequency of 13.56 MHz. When all four switches 806, 808, 826, and 828 are open (e.g., deactivated or disabled by the controller 708), the power wirelessly received by antenna 702 is routed to the DC-DC converter 714 and not the communication chip 716. The parallel combination of the inductor 834 and the capacitor 836 of the first notch filter may be tuned to be resonant at 6.78 MHz. The parallel combination of the inductor 838 and the capacitor 840 of the second notch filter may be tuned to be resonant at 6.78 MHz. Therefore, the frequency at which wireless charging occurs can be represented as follows:

$$f_{WIRELESS\_CHARGING} = \frac{1}{2\pi\sqrt{L_{834} * C_{836}}} \quad (1)$$

or $$\frac{1}{2\pi\sqrt{L_{838} * C_{840}}}$$

Thus, when a signal is received at 6.78 MHz and all four switches 806, 808, 826, and 828 are open, a path from the antenna 702 to the DC-DC converter 714 may appear to have lower impedance than a path from the antenna 702 to the communication chip 716 (e.g., because the first and/or second notch filters have a high impedance at the resonant frequency of 6.78 MHz).

In an embodiment, the impedances at the nodes shared by the antenna 702 and the notch inductors 822 and 824 for a signal traveling from the antenna 702 (e.g., when looking into the direction of the communication chip 716) is high because the switches 826 and 828 are open. Because there are no additional components in the antenna tuning, overvoltage protection, and rectifier circuit 704, the efficiency of the wireless power transfer remains almost unchanged.

Likewise, when all four switches 806, 808, 826, and 828 are closed (e.g., activated or enabled by the controller 708), the power wirelessly received by the antenna 702 is routed to the communication chip 716 and not the DC-DC converter 714. For example, when a signal is received at 13.56 MHz and all four switches 806, 808, 826, and 828 are closed, a path from the antenna 702 to the DC-DC converter 714 may appear to have higher impedance than a path from the antenna 702 to the communication chip 716 (e.g., because the parallel combination of the tuning capacitor 802 and the notch inductor 822 and the parallel combination of the tuning capacitor 804 and the notch inductor 824 act like a band-stop notch filter with a resonant frequency of 13.56 MHz). The embodiment in which all four switches 806, 808, 826, and 828 are closed is described in greater detail below with respect to FIG. 8B.

Figure 8B:
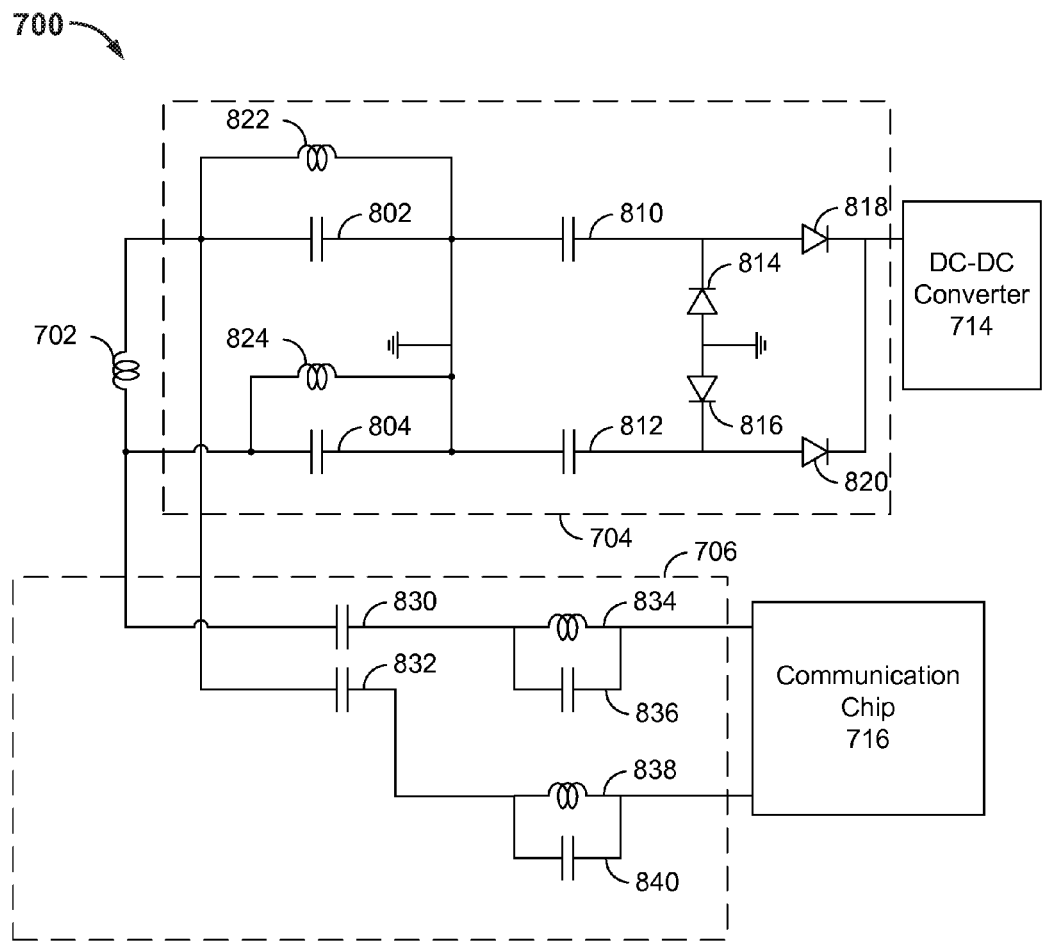
FIG. 8B is another more detailed functional block diagram of a receiver that may be used in the wireless power transfer system of FIG. 1.

FIG. 8B is another more detailed functional block diagram of the receiver 700 that may be used in the wireless power transfer system 100 of FIG. 1. In particular, FIG. 8B illustrates a model of the receiver 700 when all four switches 806, 808, 826, and 828 are closed. As illustrated in FIG. 8B, the switches 806, 808, and 826, and 828 are not present because the switches 806, 808, 826, and 828 appear to be shorted when closed.

As described above, the inductance and capacitance values of the parallel combination of the tuning capacitor 802 and the notch inductor 822 and the parallel combination of the tuning capacitor 804 and the notch inductor 824 are chosen such that the parallel combinations resonate at the data communication frequency (e.g., 13.56 MHz). Accordingly, the impedance at the node shared by the antenna 702 and the parallel combination of the tuning capacitor 802 and the notch inductor 822 and the impedance at the node shared by the antenna 702 and the parallel combination of the tuning capacitor 804 and the notch inductor 824 for a signal traveling from the antenna 702 (e.g., when looking into the direction of the DC-DC converter 714) is high because the switches 806, 808, 826, and 828 are closed. Therefore, the frequency at which data communication occurs can be prepresented as follows:

$$f_{DATA\_COMM} = \frac{1}{2\pi\sqrt{L_{822} * C_{802}}} \quad (2)$$

or $$\frac{1}{2\pi\sqrt{L_{824} * C_{804}}}$$

If longer data communication distances and/or more reliable communications are desired, the magnetic field strength can be increased. This can be achieved by increasing the antenna 702 coil current at the data communication frequency (e.g., 13.56 MHz). The antenna 702 coil current can be increased using tuning capacitors 830 and/or 832, which make the antenna 702 appear to be a low impedance path at the data communication frequency. The tuning capacitors 830 and/or 832 may cancel out the reactive difference between the antenna 702 and the first notch filter and/or the second notch filter at the data communication frequency. The reactive difference may be represented as follows:

$$2\pi f_{data} L_{702} + 2 * \left( \frac{2\pi * f_{data} * L_{834}}{1 - (2\pi * f_{data})^2 * L_{834} * C_{836}} \right) - \frac{2}{(2\pi f_{data} * C_{830})} = 0 \quad (3)$$

In this way, benefits of these embodiments may be as follows: (1) very little degradation to the efficiency of the wireless power transfer system (e.g., the antenna tuning, overvoltage protection, and rectifier circuit 704, the DC-DC converter 714, and the wireless power circuitry 724); (2) very little degradation to the performance of the data communication system (e.g., the communication circuit 706 and the communication chip 716); and (3) lower cost due to the fact that additional components do not need to be added to the existing wireless power transfer circuitry or the existing data communication circuitry and due to the fact that the antenna 702 is shared.

Figure 9:
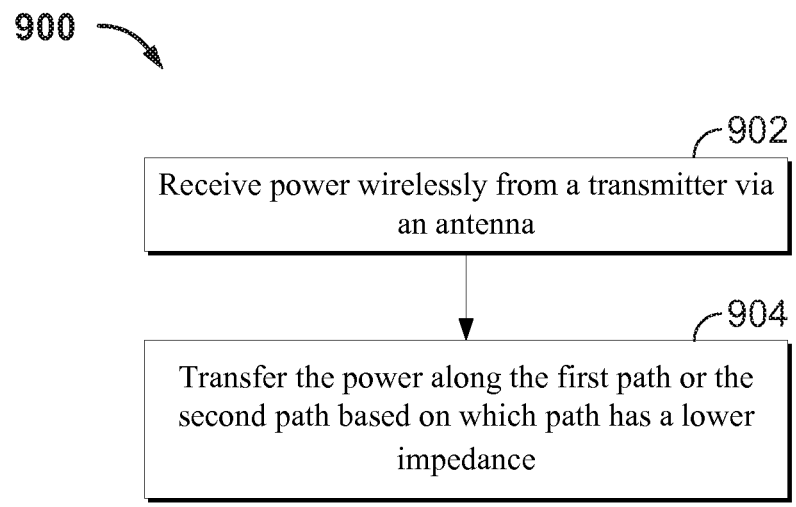
FIG. 9 is a flowchart of an exemplary method for receiving power wirelessly.

FIG. 9 is a flowchart of an exemplary method 900 for receiving power wirelessly. In an embodiment, the steps in flowchart 900 may be performed by a receiver (e.g., the receiver 700 of FIG. 7). Although the method of flowchart 900 is described herein with reference to a particular order, in various embodiments, blocks herein may be performed in a different order, or omitted, and additional blocks may be added. A person having ordinary skill in the art will appreciate that the method of flowchart 900 may be implemented in any device that may be configured to receive power wirelessly from another device and/or any device that may be configured to receive or transmit a data communication.

At block 902, power is wirelessly received from a transmitter via an antenna. In an embodiment, the antenna is coupled to a wireless power circuit via a first resonant network along a first path. In a further embodiment, the wireless power circuit is configured to operate according to a first frequency. In a further embodiment, the antenna is further coupled to a communication circuit via a second resonant network along a second path. In a further embodiment, the communication circuit configured to operate according to a second frequency. In a further embodiment, the first path has a higher impedance than the second path at the second frequency. In a further embodiment, the first path has a lower impedance than the second path at the first frequency. At block 904, the power is transferred along the first path or the second path based on which path has a lower impedance.

Figure 10:
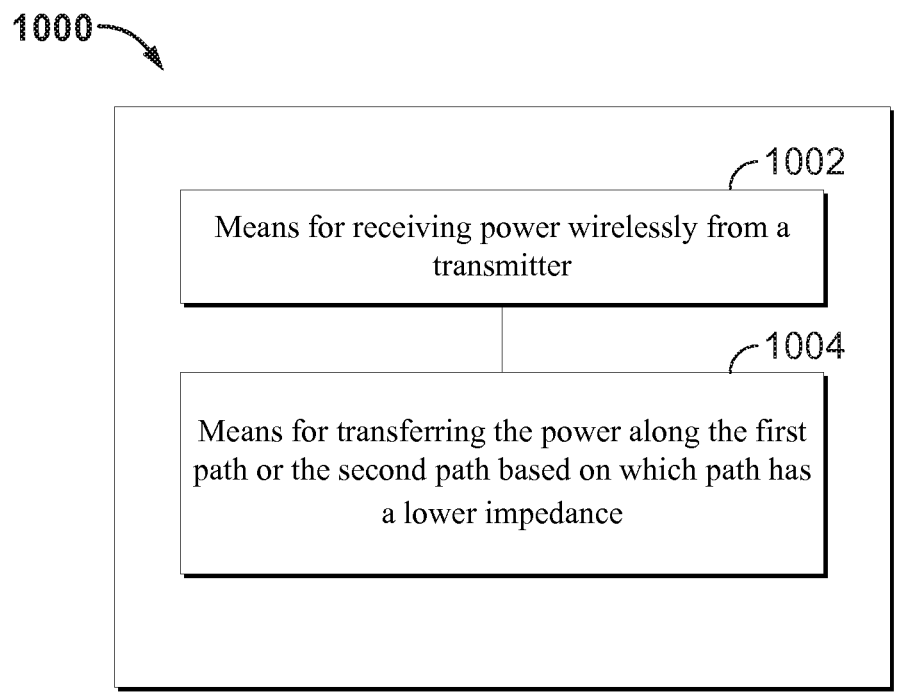
FIG. 10 is a functional block diagram of a receiver, in accordance with an exemplary embodiment.

FIG. 10 is a functional block diagram of a receiver 1000, in accordance with an exemplary embodiment. The receiver 1000 comprises means 1002 and means 1004 for the various actions discussed herein. The receiver 1000 includes means 1002 for receiving power wirelessly from a transmitter. In an embodiment, means 1002 for receiving power wirelessly from a transmitter may be configured to perform one or more of the functions discussed above with respect to block 902. The receiver 1000 further includes means 1004 for transferring the power along the first path or the second path based on which path has a lower impedance. In an embodiment, means 1004 for transferring the power along the first path or the second path based on which path has a lower impedance may be configured to perform one or more of the functions discussed above with respect to block 904.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. The means for receiving power comprises the antenna 702. The means for transferring the power comprises the antenna 702.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver for receiving power wirelessly, comprising:
an antenna configured to receive power wirelessly from a transmitter;
a wireless power circuit configured to provide the power to a load and configured to operate according to a first frequency;
a communication circuit configured to operate according to a second frequency; and
a circuit coupled between the antenna and the wireless power circuit and coupled between the antenna and the communication circuit, the circuit comprising a first resonant network and a second resonant network, the circuit comprising a first path between the antenna and the wireless power circuit via the first resonant network and a second path between the antenna and the communication circuit via the second resonant network, the first resonant network comprising a first set of switches and the second resonant network comprising a second set of switches, the first path having a higher impedance than the second path at the second frequency when the first set of switches and the second set of switches are activated and having a lower impedance than the second path at the first frequency when the first set of switches and the second set of switches are deactivated.

2. The receiver of claim 1, wherein the first set of switches and the second set of switches are configured to allow the first resonant network and the second resonant network to determine whether a signal generated by the antenna travels through the first path or the second path.

3. The receiver of claim 1, wherein the second resonant network comprises a band-stop notch tuned such that a resonant frequency of the band-stop notch is the first frequency.

4. The receiver of claim 3, wherein the band-stop notch is configured to block a signal from passing to the communication circuit when the signal is received by the antenna at the first frequency.

5. The receiver of claim 1, wherein the first resonant network comprises a capacitor and an inductor, and wherein the capacitor and inductor are tuned such that a resonant frequency of the capacitor and the inductor is the second frequency.

6. The receiver of claim 5, wherein the capacitor and the inductor are configured to block a signal from passing to the wireless power circuit when the signal is received by the antenna at the second frequency.

7. The receiver of claim 1, wherein the communication circuit is a near field communication (NFC) circuit.

8. A method for receiving power wirelessly, comprising:
receiving power wirelessly from a transmitter via an antenna, the antenna coupled to a wireless power circuit via a first resonant network along a first path, the wireless power circuit configured to operate according to a first frequency, the antenna further coupled to a communication circuit via a second resonant network along a second path, the communication circuit configured to operate according to a second frequency, the first resonant network comprising a first set of switches and the second resonant network comprising a second set of switches, the first path having a higher impedance than the second path at the second frequency when the first set of switches and the second set of switches are activated and having a lower impedance than the second path at the first frequency when the first set of switches and the second set of switches are deactivated; and
transferring the power along the first path or the second path based on which path has a lower impedance.

9. The receiver of claim 8, wherein the first set of switches and the second set of switches are configured to allow the first resonant network and the second resonant network to determine whether a signal generated by the antenna travels through the first path or the second path.

10. The receiver of claim 8, wherein the second resonant network comprises a band-stop notch tuned such that a resonant frequency of the band-stop notch is the first frequency.

11. The receiver of claim 10, further comprising blocking, by the band-stop notch, the power from passing to the communication circuit when the power is received by the antenna at the first frequency.

12. The receiver of claim 8, wherein the first resonant network comprises a capacitor and an inductor, and wherein the capacitor and inductor are tuned such that a resonant frequency of the capacitor and the inductor is the second frequency.

13. The receiver of claim 12, further comprising blocking, by the capacitor and the inductor, the power from passing to the wireless power circuit when the power is received by the antenna at the second frequency.

14. The receiver of claim 8, wherein the communication circuit is a near field communication (NFC) circuit.

15. An apparatus for receiving power wirelessly, comprising:
means for receiving power wirelessly from a transmitter, the means for receiving power wirelessly coupled to means for providing the power to a load via a first resonant network along a first path, the means for providing the power to a load configured to operate according to a first frequency, the means for receiving power wirelessly further coupled to means for providing the power to a communication chip via a second resonant network along a second path, the means for providing the power to a communication chip configured to operate according to a second frequency, the first resonant network comprising a first set of switches and the second resonant network comprising a second set of switches, the first path having a higher impedance than the second path at the second frequency when the first set of switches and the second set of switches are activated and having a lower impedance than the second path at the first frequency when the first set of switches and the second set of switches are deactivated; and
means for transferring the power along the first path or the second path based on which path has a lower impedance.

16. The apparatus of claim 15, wherein the first set of switches and the second set of switches are configured to allow the first resonant network and the second resonant network to determine whether a signal generated by the means for receiving power travels through the first path or the second path.

17. The apparatus of claim 15, further comprising means for blocking a signal tuned such that a resonant frequency of the means for blocking a signal is the first frequency.

18. The apparatus of claim 17, wherein the means for blocking comprises means for blocking the power from passing to the means for providing the power to the communication chip when the power is received by the means for receiving power at the first frequency.

19. The apparatus of claim 15, further comprising means for storing energy in an electric field and means for storing energy in a magnetic field, wherein the means for storing energy in an electric field and the means for storing energy in a magnetic field are tuned such that a resonant frequency of the means for storing energy in an electric field and the means for storing energy in a magnetic field is the second frequency.

20. The apparatus of claim 19, wherein the means for storing energy in an electric field and the means for storing energy in a magnetic field comprise means for blocking the power from passing to the means for providing the power to a load when the power is received by the means for receiving power at the second frequency.

21. The apparatus of claim 15, wherein the means for receiving power wirelessly and the means for transferring comprise an antenna.

22. A non-transitory computer-readable medium comprising code that, when executed, causes an apparatus to:
receive power wirelessly from a transmitter via an antenna, the antenna coupled to a wireless power circuit via a first resonant network along a first path, the wireless power circuit configured to operate according to a first frequency, the antenna further coupled to a communication circuit via a second resonant network along a second path, the communication circuit configured to operate according to a second frequency, the first resonant network comprising a first set of switches and the second resonant network comprising a second set of switches, the first path having a higher impedance than the second path at the second frequency when the first set of switches and the second set of switches are activated and having a lower impedance than the second path at the first frequency when the first set of switches and the second set of switches are deactivated; and transfer the power along the first path or the second path based on which path has a lower impedance.

23. The medium of claim 22, wherein the first set of switches and the second set of switches are configured to allow the first resonant network and the second resonant network to determine whether a signal generated by the antenna travels through the first path or the second path.

24. The medium of claim 22, wherein the second resonant network comprises a band-stop notch tuned such that a resonant frequency of the band-stop notch is the first frequency.

25. The medium of claim 24, further comprising code that, when executed, causes an apparatus to block, using the band-stop notch, the power from passing to the communication circuit when the power is received by the antenna at the first frequency.

26. The medium of claim 22, wherein the first resonant network comprises a capacitor and an inductor, and wherein the capacitor and inductor are tuned such that a resonant frequency of the capacitor and the inductor is the second frequency.

27. The medium of claim 26, further comprising code that, when executed, causes an apparatus to block, using the capacitor and the inductor, the power from passing to the wireless power circuit when the power is received by the antenna at the second frequency.

28. The medium of claim 22, wherein the communication circuit is a near field communication (NFC) circuit.

* * * * *